Dec. 19, 1967   A. D. MARTIN ETAL   3,358,329
EXTRUSION APPARATUS AND PRODUCTS THEREFROM
Original Filed Sept. 27, 1961                2 Sheets-Sheet 1
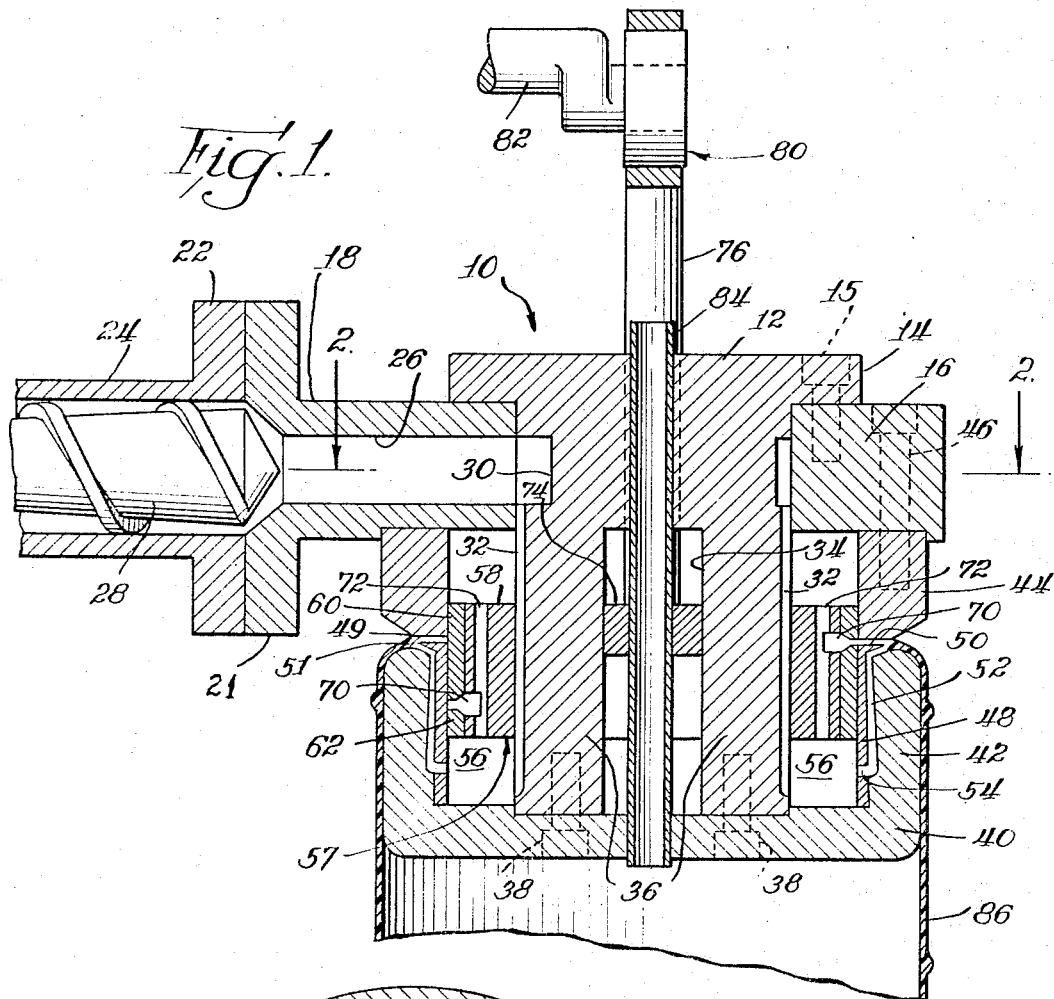
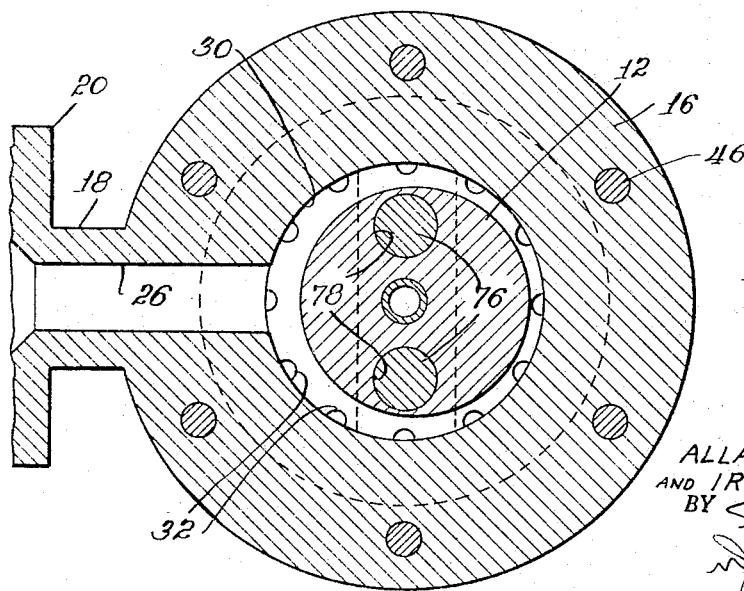
INVENTORS
ALLAN D. MARTIN
AND IRVING S. HOUVENER
BY
ATT'YS Dec. 19, 1967 A. D. MARTIN ETAL 3,358,329
EXTRUSION APPARATUS AND PRODUCTS THEREFROM
Original Filed Sept. 27, 1961 2 Sheets-Sheet 2

INVENTORS
ALLAN D. MARTIN
AND IRVING S. HOUVENER
BY
ATT'YS

United States Patent Office 3,358,329
Patented Dec. 19, 1967

3,358,329
EXTRUSION APPARATUS AND PRODUCTS THEREFROM
Allan D. Martin, Sanford, and Irving S. Houvener, Midland, Mich., assignors to The Dow Chemical Company, Midland, Mich., a corporation of Delaware
Continuation of application Ser. No. 141,163, Sept. 27, 1961. This application Mar. 16, 1964, Ser. No. 353,315
11 Claims. (Cl. 18—14)

ABSTRACT OF THE DISCLOSURE

Apparatus for extrusion through an annular slot fed by a nozzle assembly which reciprocates behind the slot. If desired, another concentric tube may be simultaneously extruded. As the nozzle assembly reciprocates, its gate is progressively exposed to the slot whereby a tubular webbing or a tube with exterior intersecting ribs thereon is formed.

---

This application is a continuation application of copending application Ser. No. 141,163, filed Sept. 27, 1961, now abandoned.

This invention relates to an apparatus adapted for fabrication of tubular webbing, which, if desired, may be formed on the exterior surface of a tubular film, to enhance its appearance and strength.

While any material which is extrudable may be used in practicing the invention, plastic materials such as normally solid polyolefins, particularly polyethylene, polypropylene, copolymers of ethylene and propylene and the like, polystyrene and nylon, may be most advantageously utilized.

The type of product under consideration is relatively new in the art of plastic extrusion. For example, reference may be made to U.S. Patent 2,919,467 issued Jan. 5, 1960, to F. B. Mercer, which discloses a method and apparatus for fabrication of plastic net-like structures. While the teachings of the Mercer patent and those of the present disclosure, have certain objectives in common, the method, apparatus and product disclosed herein differ significantly from that of the Mercer patent. Considering the product, that produced by the apparatus of Mercer is obtained in effect, by longitudinally splitting or shearing extruded strands of material as they move from an extrusion nozzle. Predetermined lengths of each strand are left unsplit whereby adjoining strands will be interconnected in a manner as to form a net-like structure.

In the product produced by the apparatus of the present invention, the strands making up the web-like structure are extruded with a uniform thickness diameter and in a predesignated manner to achieve a web-like product. Irrespective of the relative merits of the comparative products under consideration, the principles of the present invention provide greater flexibility in product, for among other things, either tubular webbing or tubular film having a web-like exterior, may be extruded in a continuous operation. The apparatus of the present invention may likewise be used to achieve a great variety of web patterns, as with the apparatus of the Mercer patent.

The main object of this invention is to provide apparatus for producing webbing in a continuous extrusion operation.

Another object of the invention is to provide apparatus for producing plastic webbing in a continous extrusion operation wherein the pattern of the webbing may be varied.

Still another object of the invention is to provide apparatus for producing a plastic tubular product in either webbing form, or as a solid film having an integrally formed webbing exterior surface.

These and further objects and features of the invention will become more apparent from the following description and accompanying drawings wherein:

FIG. 1 is an elevation view in cross-section of extruder apparatus embodying the principles of the invention;

FIG. 2 is a section view generally as seen along line 2—2 in FIG. 1;

Figure 3:
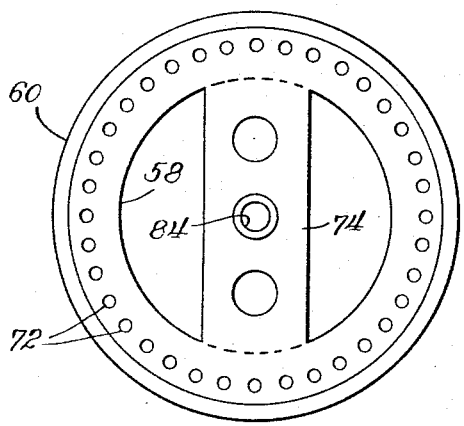
FIG. 3 is a top view of a rib forming nozzle assembly.

Referring now to the drawings, an extruder head assembly 10 includes a body core 12, which is generally cylindrical in shape and has a flange 14 at the upper end to which is secured, by fastening means such as cap screws 15, a disc-like body 16. The latter is provided with an integral neck portion 18 having a flange 20 adapted for coupling with a flange 22 of an extruder barrel 24 of a plastic extruder (not shown). A sprue, comprising a passageway 26 formed in the body 16, is arranged for receipt of plastic material from the extruder forced into the passageway by an extruder screw 28. Passageway 26 opens into a gate, comprising a circumferential groove 30 formed on the periphery of the body core 12. The gate 30 has an eccentric configuration, as best seen in FIG. 2, whereby the groove depth tapers uniformly bi-directional to a point of minimum depth directly opposite the passageway 26. In such manner, a pressure distributing means is provided for plastic material forced into the gate 30 so that it will flow more evenly during continuous extrusion operation, as will be more apparent hereinafter.

A plurality of vertically arranged semi-circular distributing grooves 32 are formed on the periphery of the body core 12, which grooves provide for flow of plastic material downwardly from the gate 30. The body core 12 has a diametrical recess 34 extending from its lower end to a point slightly below a horizontal projection of the lower edge of the gate 30. In effect, such recess 34, serves to fashion a pair of segmental legs 36 out of a major portion of the body core 12.

Secured to the lower end of the legs 36 by fastening means, such as cap screws 38, is a lower film forming nozzle part 40, which is cup-like in form with a side wall 42 extending upwardly, as best seen in FIG. 1. An upper stationary rib forming nozzle part 44, which is cylindrical in form, is secured to the underside of the body 16 by fastening means such as cap screws 46. A lower stationary film forming nozzle part 48, in the form of a sleeve having a radially directed and tapered flange 50 at the upper end, is mounted within the nozzle part 40. The sides of the flange 50 are in spaced relation to the end of the nozzle part 44, and nozzle part 40, to provide circumferential openings, or slots, 49 and 51, respectively, as best seen in FIG. 1. A major portion of the nozzle part 48 is in spaced relation to the nozzle part wall 42, to provide a film forming gate 52. A plurality of flow control orifices 54 are formed in the nozzle part 48, whereby plastic material may be forced into the gate 52.

The inner diameter of the nozzle part 48 and the inner diameter of the nozzle part 44 are equal, and define in part a chamber 56 the confines of which are further defined by the under surface of the body 16, the peripheral surface of each leg 36, and the inner bottom surface of the nozzle part 40.

Mounted for reciprocal movement in the chamber 56 is a rib forming nozzle assembly 57 including a body part 58, upper part 60, and a lower part 62, all of which are primarily cylindrical in form. The body part 58 has a groove 64 on the peripheral surface which has a zig-zag, or saw tooth configuration. The lower edge of the part 60 has a saw tooth configuration 66 corresponding with the upper edge of the groove 64, while the upper edge of part 62 has a saw tooth configuration 68 corresponding with the lower edge of the groove 64. The parts 60 and 62 are press fit upon the body part 58, so that the edges 66, 68 and groove 64 define a gate 70, the radially outer edge of which opens unto the circumferential wall of chamber 56, while the inner edge is intersected by a plurality of vertically arranged holes 72 extending through the body part 58.

A cross bar 74 is provided in the body 58, to which is connected two rods 76 extending upwardly through holes 78 formed in the body core 12. The upper end of the rods 76 are provided with an eccentric arrangement 80, driven by a rotatable shaft 82 operated from a motor means (not shown) whereby reciprocal movement of the rods is provided. In such manner, reciprocal movement of the nozzle assembly 57 in chamber 56 is effected.

Extending through the body core 12 as well as the cross bar 74 and nozzle part 40, is a tube 84, the upper end of which is connected to a source of pressurized medium, preferably air, whereby a tube of film 76 being extruded from the assembly 10 may be blown out to desired size.

Figure 5:
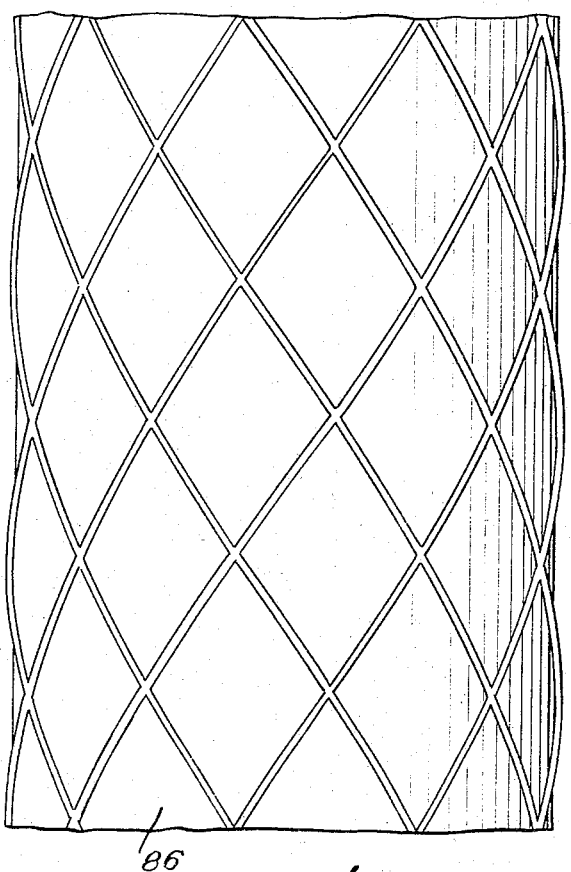
FIG. 5 is an exterior view of a tubular film with webb ribbing on the exterior surface as produced by the apparatus of FIG. 1.
Figure 4:
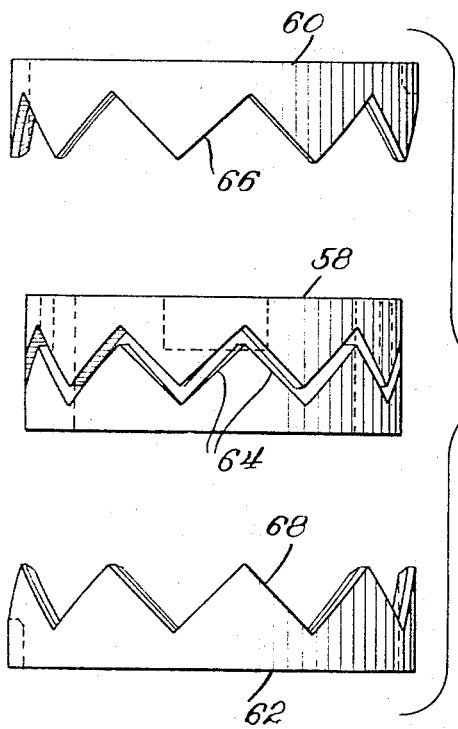
FIG. 4 is an exploded view of certain components forming the assembly shown in FIG. 3.

Operation of the extruder assembly should be apparent, however, briefly it is as follows. Plastic material is forced under pressure from a source into the sprue 26, from whence it flows into the gate 30, and down through the grooves 32 into the chamber 56 on both upper and lower sides of the nozzle assembly 57. It then passes through the holes 72 into the gate 70. As the nozzle assembly 57 is reciprocated, the gate 70 will be moved across the circumferential opening, or slot 49, whereby plastic will flow out of the gate 70 in ribbon form, since only discrete portions of the saw tooth gate will be uncovered by the slot 49 in any given position of the nozzle assembly. In effect, the plastic material will be extruded from the slot 49 in ribbon form, which will assume a criss-cross generally diamond-shaped pattern, as illustrated in FIG. 5.

Simultaneously with extrusion of plastic from the slot 49, a tubular film of plastic material will be extruded from the slot 51, via gate 52 as fed from the chamber 56, by way of orifices 54. Since the plastic being extruded from the slots 49 and 51 will be soft, or in semi-liquid form, the web-like extrudate from slot 49, will fuse or intimately adhere to the tubular extrudate from slot 51, to form a solid tube having an exterior web-like surface, which among other things, enhances the appearance and strength of the tube. Upon emerging from the extruder head assembly 10 the tubular product may be moved through a liquid bath (not shown), or air cured, depending upon the type of material being processed, which technique is of course well known to those skilled in the art. In addition, the tubular product may be split to provide a flat sheet of webbing, if desired. However, a flat webbing may preferably be fabricated utilizing the apparatus of the copending application of Allan D. Martin, Ser. No. 141,161 filed Sept. 27, 1961.

If it is desired to extrude only a web-like tubular form, it is only necessary to remove or block the gate 52, whereby the solid tubular film portion, as normally extruded from the slot 51, will be eliminated.

It will be obvious that the pattern of the webbing extruded will depend upon various factors including the configuration of the groove 64, and the edges 66, 68 defining gate 70, as well as the velocity of extrusion and speed of reciprocating movement of the nozzle assembly 57. Possibilities in addition to the generally square, or diamond shaped pattern illustrated in FIG. 5, are circles, stars, and simple abstract shapes.

The foregoing description has been given in detail without thought of limitation since the inventive principles involved are capable of assuming other forms without departing from the spirit of the invention or the scope of the following claims.

What is claimed is:
1. Apparatus for extruding tubular webbing comprising means to extrude material in fluid form, a cylindrical first nozzle member having a chamber with a circumferential opening, said means to extrude communicating with said chamber, a second nozzle member reciprocally movable within said first nozzle member and having a circumferential gate of irregular path in its wall, means to reciprocally move said second nozzle member, said circumferential gate of said second nozzle member being positioned adjacent said circumferential opening of said first nozzle member, whereby upon reciprocation of said second nozzle member and extrusion of material into said chamber, tubular webbing will be extruded through said circumferential opening.

2. The apparatus of claim 1, wherein said irregular path of said circumferential gate of said second nozzle member has a saw tooth pattern.

3. Apparatus for extruding a tube having a cross-ribbed surface comprising means to extrude material in fluid form, a cylindrical first nozzle member having a chamber, said means to extrude communicating with said chamber, said nozzle member having at least two circumferential openings in its wall, separate gate means communicating with said chamber and one of said circumferential openings, said openings being juxtapositioned with respect to each other, a second nozzle member reciprocally movable within said first nozzle member and having a circumferential gate of irregular path in its wall, means to reciprocally move said second nozzle member, said circumferential gate of said second nozzle member being positioned adjacent one of said two circumferential openings of said first nozzle member, whereby, upon reciprocation of said second nozzle member and extrusion of material into said chamber, a tube having a cross-ribbed surface will be extruded through said circumferential opening.

4. The apparatus of claim 3, wherein the irregular path of said circumferential gate of said second nozzle member has a saw tooth pattern.

5. Apparatus for continuously extruding plastic tubular film having a cross ribbed surface including a core, an enclosing means about said core to provide a chamber therebetween, plastic material inlet means to said chamber, and a nozzle assembly reciprocally mounted within said chamber, said nozzle assembly having an annular gate on its periphery, said gate having a repetitive irregular path, said enclosing means having an annular slot opposite said gate, and plastic material feed means from said chamber to said gate, and to said slot respectively.

6. Apparatus for continuously extruding plastic tubular film having a cross ribbed surface including a core, an enclosing means about said core to provide an annular chamber, said core having a plurality of distributing grooves extending the full length of the chamber, plastic material inlet means to said distributing grooves, and a circular nozzle assembly reciprocally mounted within said chamber, said nozzle assembly having an annular gate on its periphery, said gate having a generally saw tooth pattern, a plurality of holes extending through said nozzle assembly and intersecting said gate, said enclosing means having an annular slot opposite said gate, and plastic material feed means from said chamber to said gate and to said slot respectively.

7. Apparatus for continuously extruding plastic tubular film having a cross ribbed surface including a core, said core having a circumferential groove near one end thereof, a sprue leading to said circumferential groove, an upper nozzle part and a lower nozzle part surrounding the core and providing an annular chamber about said core, said core having a plurality of distributing grooves extending the full length of said chamber, said upper and lower nozzle parts being spaced from each other to provide a substantially horizontal annular slot about said chamber, a circular nozzle assembly reciprocally mounted within said chamber, said nozzle assembly having an annular gate on its periphery, said gate having a generally saw tooth pattern, a plurality of holes extending through said nozzle assembly and intersecting said gate, said horizontal annular slot being positioned opposite said gate, said lower nozzle part having an annular film forming orifice therein in communication with said horizontal slot.

8. Apparatus according to claim 7, wherein said circular nozzle assembly includes a body part with a groove therein having a generally saw tooth pattern, an upper part mounted upon said body part and having a lower edge conforming in shape with the upper edge of said groove, and a lower part mounted upon said body part and having an upper edge conforming in shape with the lower edge of said groove to provide an annular gate with a saw tooth pattern.

9. Apparatus according to claim 7, wherein a fluid pressure tube is arranged to extend through said core and said lower nozzle part.

10. Apparatus according to claim 7, wherein said core has a diametrical recess and said body part has a cross bar which fits within said recess.

11. Apparatus according to claim 10, wherein a pair of rods are connected at one end to said cross bar, which rods extend through said core and project from the upper end thereof, and means to provide reciprocal movement to said rods.

References Cited
UNITED STATES PATENTS

| | | | |
|---|---|---|---|
| 2,345,086 | 3/1944 | Becker et al. | 18—14 |
| 3,112,526 | 12/1963 | Martin | 18—12 |
| 3,163,691 | 12/1964 | Anderson et al. | 18—12 |
| 3,172,154 | 3/1965 | Martin | 18—12 |
| 3,193,604 | 7/1965 | Mercer | 18—12 |
| 3,291,879 | 12/1966 | Martin | 18—12 |

WILLIAM J. STEPHENSON, *Primary Examiner.*